US012568981B1

(12) United States Patent
Allam et al.

(10) Patent No.: US 12,568,981 B1
(45) Date of Patent: Mar. 10, 2026

(54) PLANT-BASED ADDITIVE FOR INHIBITING NITRITE FORMATION DURING MEAT PREPARATION

(71) Applicant: IMAM MOHAMMAD IBN SAUD ISLAMIC UNIVERSITY, Riyadh (SA)

(72) Inventors: Ahmed Aly Ahmed Allam, Riyadh (SA); Hassan Ahmed Rudayni, Riyadh (SA); Abdullah Sultan Alawam, Riyadh (SA); Rehab Khaled Mahmoud, Beni Suef (EG); Amany Ahmed Abd-El Halim Mohamed, Fayoum (EG); Nabil Sayed Hafez, Fayoum (EG); Khalil Ibrahim Khalil, Fayoum (EG); Samah Ahmed Abd-El Twab Awad, Fayoum (EG)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/063,241

(22) Filed: Feb. 25, 2025

(51) Int. Cl.
| | |
|---|---|
| *A23B 4/20* | (2006.01) |
| *A23B 2/733* | (2025.01) |
| *A23B 2/788* | (2025.01) |
| *A23B 4/24* | (2006.01) |

(52) U.S. Cl.
CPC .............. *A23B 4/20* (2013.01); *A23B 2/733* (2025.01); *A23B 2/788* (2025.01); *A23B 4/24* (2013.01)

(58) Field of Classification Search
CPC .... A23B 4/20; A23B 4/24; A23B 4/18; A23B 4/14; A23B 4/12; A23B 4/10; A23B 4/00; A23B 2/788; A23B 2/733
See application file for complete search history.

(56) References Cited

U.S. PATENT DOCUMENTS

| | | |
|---|---|---|
| 2020/0305451 A1 | 10/2020 | Ban et al. |
| 2022/0022474 A1 | 1/2022 | Husgen et al. |
| 2023/0029496 A1 | 2/2023 | Qsburn et al. |

FOREIGN PATENT DOCUMENTS

SI           23754 A  *  12/2012  ............. A23B 2/733

OTHER PUBLICATIONS

Hord et al "Food sources of nitrates and nitrites: the physiologic context for potential health benefits" The American Journal of Clinical Nutrition vol. 90, Issue 1, Jul. 2009, pp. 1-10 https://www.sciencedirect.com/science/article/pii/S0002916523231937 (Year: 2009).*

Ha-Yoon Go, et al., "Effect of Red Cabbage on the Quality and Storage Characteristics of Emulsion-TypePork Sausage", Journal of the Korean Society of Food Science and Nutrition 2021, 50(11), pp. 1218-1228, 23 pages.

Amany Abd El-Halim, et al., "Effectiveness of Zinc Oxide Nanoparticles, Red Cabbage and Beet Root in Reducing Bacterial and Fungal Growth in Refrigerated Beef Kofta", Journal of Food and Dairy Sciences, Mansoura Univ.. vol. 15 (11):177-185, 2024, 9 pages.

* cited by examiner

*Primary Examiner* — Versa Stulii
(74) *Attorney, Agent, or Firm* — Oblon, McClelland, Maier & Neustadt, L.L.P.

(57) ABSTRACT

A method of fabricating a plant-based additive for inhibiting nitrite formation during meat preparation includes reacting a pomegranate peel extract with a zinc precursor solution to obtain a reaction mixture, stirring the reaction mixture for 15 to 60 min at a temperature of 50 to 90° C. to obtain zinc oxide nanoparticles; and combining the zinc oxide nanoparticles with at least one extract selected from the group consisting of red cabbage extract and a beet root extract to obtain the plant-based additive. The extract comprises 500 to 1000 parts per million of nitrate relative to a total weight of the plant-based additive.

20 Claims, 5 Drawing Sheets

PLANT-BASED ADDITIVE FOR INHIBITING NITRITE FORMATION DURING MEAT PREPARATION

BACKGROUND

Technical Field

The present disclosure is directed to a plant-based additive, more particularly, towards a plant-based additive for inhibiting nitrite formation during meat preparation and a method for preventing and/or inhibiting bacterial growth on food.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Traditionally, synthetic curing agents, such as sodium nitrite, are commonly used in meat products to inhibit microbial growth, enhance color, and improve flavor. These agents effectively prevent the growth of harmful bacteria and help maintain the quality of meat. However, the use of synthetic nitrites has become controversial because they contribute to the formation of nitrosamines, especially when cooked at high temperatures, which can promote nitrosamine production [See: Bedale, W., Sindelar, J. J., & Milkowski, A. L. (2016). *Dietary nitrate and nitrite: Benefits, risks, and evolving perceptions. Meat Science*, 120, 85-92]. This association has raised public concern and led to increased regulatory scrutiny over the use of synthetic nitrites in food products. As a result, the food industry is actively seeking safer alternatives that provide similar preservative benefits without the associated health risks. In response, the industry has been exploring natural sources of nitrates, such as plant powders, to replace synthetic nitrites in meat products. Vegetables like spinach, celery, and beetroot are naturally rich in nitrates, which can be converted into nitrites through bacterial action during fermentation or cooking. This natural conversion process can effectively inhibit nitrosamine formation while still providing the desired preservation effects [See: Sebranek, J. G., & Bacus, J. N. (2007). *Cured meat products without direct addition of nitrate or nitrite: What are the issues? Meat Science*, 77 (1), 136-147]. Additionally, these plant-based powders serve not only as natural preservatives but also provide extra health benefits.

Although a few plant-based additives that inhibit nitrosamine formation are known in the art, each of the aforementioned suffers from one or more drawbacks hindering their adoption. Accordingly, it is one objective of the present disclosure to provide a plant-based additive that can function as a preservative and a nutritive component, while also inhibiting nitrite formation during meat preparation.

SUMMARY

In an exemplary embodiment, a method of fabricating a plant-based additive for inhibiting nitrite formation during meat preparation is described. The method includes reacting a pomegranate peel extract with a zinc precursor solution to obtain a reaction mixture, stirring the reaction mixture for 15 to 60 min at a temperature of 50 to 90° C. to obtain zinc oxide nanoparticles, and combining the zinc oxide nanoparticles with at least one extract selected from the group consisting of red cabbage extract and a beet root extract to obtain the plant-based additive. The extract comprises 500 to 1000 parts per million of nitrate relative to a total weight of the plant-based additive.

In some embodiments, the zinc precursor comprises at least one selected from the group consisting of zinc sulfate heptahydrate, zinc chloride hexahydrate, zinc hydroxide dihydrate, and zinc acetate dihydrate.

In some embodiments, the plant-based additive is in the form of a pellet.

In some embodiments, the method includes stirring the reaction mixture for 15 to 60 min at a temperature of 50 to 90° C. for 60 min at a temperature of 70° C.

In some embodiments, the extract is a beetroot extract, and the plant-based additive comprises 894 parts per million of nitrates relative to the total weight of the plant-based additive.

In some embodiments, the extract is a red cabbage extract, and the plant-based additive comprises 678±1 parts per million of nitrates relative to the total weight of the plant-based additive.

In some embodiments, the reaction mixture has a volume ratio of pomegranate peel extract to zinc precursor solution of 1:35 to 1:15 pomegranate peel extract to zinc precursor solution.

In some embodiments, the method further includes separating peels from a pomegranate fruit and drying to obtain dried pomegranate peels; and grinding the dried pomegranate peels into a fine powder to obtain the pomegranate peel extract.

In some embodiments, the fine powder has an average particle size of 20 µm or less.

In some embodiments, the zinc precursor solution comprises zinc acetate dihydrate.

In some embodiments, the reaction mixture has a volume ratio of pomegranate peel extract to zinc precursor solution of 1:19 pomegranate peel extract to zinc precursor solution.

In some embodiments, the method further includes contacting the plant-based additive with meat, then cooking to obtain a prepared meat, wherein the plant-based additive comprises zinc oxide nanoparticles 3 to 8 parts per million of nitrites relative to a total weight of the plant-based additive.

In some embodiments, the prepared meat has a total volatile nitrogen (TVN) value of 7 to 10.

In some embodiments, the prepared meat has a residual nitrite content of 30 to 70 parts per million relative to a total weight of the prepared meat.

In some embodiments, the prepared meat has a nitrosamine concentration of 20 to 35 ng/mL.

In some embodiments, the prepared meat has a TVN of 20.5 or less after 21 days.

In some embodiments, the prepared meat has a residual nitrite content of 20 to 60 parts per million relative to a total weight of the prepared meat after 21 days.

In some embodiments, the prepared meat has a nitrosamine concentration of 27.5 to 30 ng/mL.

In some embodiments, the extract is a beetroot extract comprising 4.5 to 5 parts per million of nitrites relative to the total weight of the plant-based additive.

In some embodiments, the extract is a red cabbage extract comprising 6.5 to 7 parts per million of nitrites relative to the total weight of the plant-based additive.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
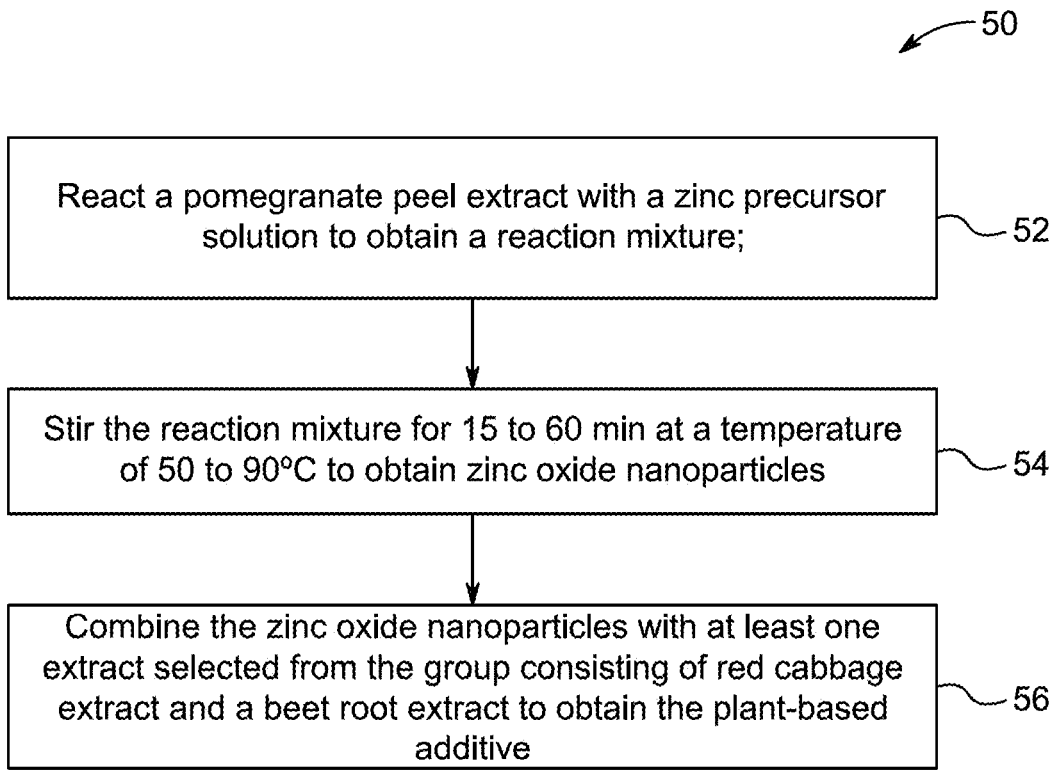
FIG. 1 is a schematic flow chart of a method of preparing plant-based additives for inhibiting nitrite formation during meat preparation, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

As used herein, the term "plant-based additive" refers to any substance derived from plants, such as extracts, powders, or oils, that is incorporated into food products to enhance their flavour, nutritional value, texture, or preservative qualities. These additives are natural alternatives to synthetic ingredients, often used for their health benefits and minimal processing.

As used herein, the term "nitrite formation" refers to the chemical process in which nitrite ions ($NO_2^-$) are generated, typically through the reaction of nitrates with other compounds, and often used in food processing to preserve meats and inhibit bacterial growth.

As used herein, the term "nitrate formation" refers to the chemical process in which nitrate ions ($NO_3^-$) are produced, typically through natural or synthetic processes, and are often used as preservatives in food products or as a precursor to nitrite formation in meat processing.

As used herein, the term "total volatile nitrogen" refers to the sum of nitrogen-containing compounds that are released as volatile substances during the breakdown of proteins, commonly used as an indicator of protein degradation and spoilage in food products, particularly in meat and seafood using for example ISO/DIS 19615 and/or TVB-N.

As used herein, the term "residual nitrite content" refers to the amount of nitrite remaining in a food product after processing, typically following the use of nitrites as preservatives or curing agents and is an important measure for ensuring food safety and quality.

As used herein, the term "nitrosamine concentration" refers to the amount of nitrosamines present in a substance, typically in food products, formed as a result of the reaction between nitrites and amines, and is of concern due to their potential carcinogenic properties.

As used herein, the term "beetroot extract" refers to a concentrated substance derived from the root of the beet plant (*Beta vulgaris*), known for its rich content of bioactive compounds, such as betalains, antioxidants, and nitrates.

As used herein, the term "red cabbage extract" refers to a concentrated substance derived from the leaves of red cabbage (*Brassica oleracea*), which is rich in anthocyanins, antioxidants, and other bioactive compounds.

As used herein, the term "beef kofta" refers to a traditional ground meat dish made from minced beef, often mixed with spices, herbs, and other ingredients, shaped into balls or patties, and typically cooked by grilling, frying, or baking. It is commonly found in Middle Eastern and South Asian cuisines.

An aspect of the present disclosure is directed to a method of reducing nitrosamine formation and enhancing the quality attributes of beef kofta by incorporating zinc oxide nanoparticles (ZnO NP) and plant-based powders, such as beetroot and red cabbage, as natural nitrate sources, offering a healthier alternative to synthetic nitrites in meat processing.

FIG. 1 illustrates a schematic flow chart of a method 50 of preparing plant-based additive for inhibiting nitrite formation during meat preparation. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes reacting a pomegranate peel extract with a zinc precursor solution to obtain a reaction mixture. Pomegranate peel (Punica granatum) is a rich wellspring of several antioxidants and bioactive compounds, particularly phenols and flavonoids. Some of the bioactive substances present in the pomegranate peel are chlorogenic acid, catechin, methyl gallate, coffee acid, syringic acid, ellagic acid, vanillin, ferulic acid, naringenin, daidzein, and quercetin. The extract of the pomegranate peel is prepared by carefully removing the peel from the pomegranate. The peel may be the outer peel, the inner peel, or a combination thereof. After peeling, the peel is subjected to a specific extraction process to obtain the extract. The extract includes various bioactive compounds. Although the description herein provided refers to the use of peels of pomegranate, it may be understood by a person skilled in the art that the extract may also include any other constituents of pomegranate—for example, seed, juice, or any other plant parts, etc.

The method of obtaining the pomegranate peel extract is known to a person skilled in the art. In an embodiment, the pomegranate peel extract may be prepared by initially obtaining peels of pomegranate. Both outer and/or inner peels of the pomegranate can be used. The peels are then washed with a solvent, preferably water, to remove impurities. The water may be tap water, distilled water, bidistilled water, deionized water, deionized distilled water, reverse osmosis water, and/or some other water. In a preferred embodiment, the peels are washed with distilled water. After washing, the pomegranate peel is dried at 20 to 60° C., preferably 30 to 50° C., preferably 30° C. for 24 to 36 hours (h) to obtain a dried peel. The drying temperature and time may vary depending on the moisture content in the peel. In an embodiment, the pomegranate peel may be dried in an oven or air dried at room temperature. The dried peel has a moisture content of less than 30%, preferably 25%, preferably 20%, preferably 15%, and preferably 10%.

In some embodiments, after drying, the dried peel is ground to obtain a fine powder. In an embodiment, the dried peel can be crushed using ball-milling/manual grinding to obtain the fine powder. The fine powder has a particle size of less than 100 nm. In some embodiment, the fine powder has an average particle size of 20 μm, preferably 25 μm, preferably 30 μm, preferably 35 μm, preferably 40 μm, preferably 45 μm, preferably 50 μm, or less.

The fine powder is further treated with a polar protic solvent to obtain the pomegranate peel extract. Suitable examples of the polar protic solvent include, but are not limited to, water, ethanol, methanol, ammonia, acetic acid, formic acid, and hydrogen fluoride. In a preferred embodiment, the polar protic solvent is ethanol, preferably 50% ethanol, preferably 60% ethanol, preferably 70% ethanol, preferably 80% ethanol, preferably 90% ethanol, preferably 95% ethanol, preferably 98% ethanol, preferably 99% ethanol, preferably absolute ethanol. In a preferred embodiment, the polar protic solvent is 70% ethanol. In some embodiments, the pomegranate peel extract may be further dried using a drying appliance, such as a rotary drier. In some embodiments, the extract may be lyophilized to obtain it in a powder form.

The pomegranate peel extract is further mixed with a zinc precursor solution to obtain zinc oxide nanoparticles. In some embodiments, the zinc precursor solution may include, but is not limited to, zinc chloride, zinc sulfate, zinc nitrate, zinc oxide, zinc hydroxide, zinc carbonate, zinc formate, zinc citrate, zinc gluconate, zinc stearate, zinc tartrate, zinc phosphate, zinc silicate, zinc borate, zinc perchlorate, zinc chromate, zinc bromide, zinc iodide, zinc thiocyanate, zinc acetylacetonate, zinc pyrophosphate, zinc molybdate, zinc selenate, zinc tellurate, zinc ferrite, zinc tungstate, zinc gallate, zinc stannate, zinc titanate, and zinc aluminate. In some embodiments, the zinc precursor includes at least one selected from the group consisting of zinc sulfate heptahydrate, zinc chloride hexahydrate, zinc hydroxide dihydrate, and zinc acetate dihydrate. In a preferred embodiment, the zinc precursor solution includes zinc acetate dihydrate. In some embodiment, the concentration of zinc precursor solution is in the range of 0.001-0.05 M, preferably 0.005-0.05 M, preferably 0.01-0.05 M, preferably 0.02-0.05 M, preferably 0.03-0.05 M, preferably 0.04-0.05 M. In a preferred embodiment, the concentration of zinc precursor solution is 0.01 M.

In some embodiments, the reaction mixture may have a volume ratio of pomegranate peel extract to zinc precursor solution ranging from 1:35 to 1:15, preferably from 1:34 to 1:20, preferably from 1:33 to 1:18, preferably from 1:32 to 1:22, preferably from 1:30 to 1:16, preferably from 1:28 to 1:15. In a preferred embodiment, the reaction mixture has a volume ratio of pomegranate peel extract to zinc precursor solution of 1:19.

At step 54, the method 50 includes stirring the reaction mixture for 15 to 60 min at a temperature of 50 to 90° C. to obtain zinc oxide nanoparticles. In some embodiments, the reaction mixture may be stirred for about 15 to 60 minutes, preferably 20 to 45 minutes, preferably 25 to 40 minutes, preferably from 30 to 35 minutes. In a preferred embodiment, the reaction mixture is stirred for 60 minutes. In some embodiments, the reaction mixture is stirred at a temperature ranging from 50 to 90° C., preferably from 55 to 85° C., preferably 60 to 80° C., preferably 65 to 75° C., preferably 52 to 88° C., preferably from 70 to 90° C. In a preferred embodiment, the reaction mixture is stirred at 70° C. to obtain the zinc oxide nanoparticles.

In some embodiments, this step is carried out at room temperature, although it is possible to perform this step at slightly elevated or higher temperatures to speed up the reaction.

In some embodiments, the size, shape and morphology of the zinc oxide nanoparticles is influenced by various parameters like, concentration of the zinc precursor solution, temperature of the reaction, amount of pomegranate peel extract, etc.

At step 56, the method 50 includes combining the zinc oxide nanoparticles with at least one extract selected from the group consisting of red cabbage extract and a beet root extract to obtain the plant-based additive.

In an embodiment, the plant-based additive is prepared by combining the zinc oxide nanoparticles with a beet root extract. The term "beetroot" may include any one or more of a sugar beet, red beet, table beet, beets, *Beta vulgaris*, garden beet, and/or combination thereof. An extract of the beetroot can be prepared from any part including the root and the root bark, in order to prepare the beetroot extract. The beetroot extract can be in the form of a dry powder prepared, for example, through directly freeze-drying or spray-drying. Also, squeezed juice or grounded paste from the beetroot may be used to obtain the beetroot extract. Also, an extract, for example, extracted from the beetroot with a solvent such as water added thereto can be used.

In an embodiment, the plant-based additive is prepared by combining the zinc oxide nanoparticles with a red cabbage extract. In some embodiments, extracts from other cabbages like, white cabbage, green cabbage, cannonball cabbage, Danish Ballhead, pointed cabbage, savoy cabbage, napa cabbage, bak choy, choy sum, January King, Tuscan cabbage, may also be used, alone or in combination with red cabbage. An extract of the red cabbage can be prepared from any part including the leaves or stem, in order to prepare the red cabbage extract. The red cabbage extract can be in the form of a dry powder prepared, for example, through directly freeze-drying or spray-drying. Also, squeezed juice or grounded paste from the red cabbage may be used. Also, an extract, for example, extracted from the red cabbage with a solvent such as water added thereto can be used.

The extract includes 500 to 1000 parts per million, preferably 520-950 ppm, preferably 550-900 ppm, preferably 600-850 ppm, preferably 650-800 ppm, preferably 700-750 ppm of nitrate relative to a total weight of the plant-based additive. In a preferred embodiment, the extract is a beetroot extract, and the plant-based additive includes 894 parts per million of nitrates relative to the total weight of the plant-based additive. In a preferred embodiment, the extract is a red cabbage extract, and the plant-based additive comprises 678+1 parts per million of nitrates relative to the total weight of the plant-based additive.

In some embodiments, the plant-based additive includes zinc oxide nanoparticles in the range of 3 to 8 parts per million (ppm), preferably 4.5-9.5 ppm, preferably 5-9 ppm, preferably 5.5-8.5 ppm, preferably 6-8 ppm, preferably 6.5-7.5 ppm of nitrites relative to a total weight of the plant-based additive. In a preferred embodiment, the extract is a beetroot extract and includes 4.89 parts per million of nitrites relative to the total weight of the plant-based additive. In a preferred embodiment, the extract is a red cabbage extract and it includes 6.91 parts per million of nitrites relative to the total weight of the plant-based additive.

In one embodiment, the plant-based additive is in the form of a pellet.

At step 58, the method 50 includes contacting the plant-based additive with meat, then cooking to obtain a prepared meat. In some embodiments, meat may include, but is not limited to, chicken, lamb, pork, turkey, duck, venison, goat, rabbit, bison, veal, mutton, ostrich, quail, pheasant, kangaroo, antelope, camel, elk, grouse, guinea fowl, alpaca, yak, wild boar, salami, ham, bacon, sausage, jerky, corned beef, and pastrami. In a preferred embodiment, meat is beef kofta.

The plant-based additive may be contacted with meat in the form of a liquid or a powder. In one aspect, a solution or suspension of the plant-based additive is brushed onto the meat as a liquid. In other embodiments, the meat may be marinated or treated under pressure while immersed in a solution or suspension of the plant-based additive. The plant-based additive may permeate into the meat through the surface and between fibers and/or collagen based materials. The plant-based additive may be injected into the interior portion of a meat cut without separate contact with an outer surface of the meat cut, for example injection by syringe. The plant-based additive can be used as a dry rub or a component of a dry rub for contacting meat. The amount of plant-based additive contacted with the meat may vary, depending on the freshness of meat, the cut of meat, the species, and past or future storage conditions of the meat.

In some embodiments, the prepared meat has a total volatile nitrogen (TVN) value of 7 to 10, preferably, 7.5-9.8, preferably, 7.2-9.5, preferably, 7.3-9.1, preferably, 7.1-8.9, preferably, 7.6-8.8. In a preferred embodiment, the prepared meat has a total volatile nitrogen (TVN) value of 8.50. In some embodiment, the prepared meat has a TVN of 20.5, preferably 21, preferably 22, preferably 23, preferably 24, preferably 25 or less after 21 days. In a preferred embodiment, the prepared meat has a TVN of 20.45 after 21 days.

In some embodiments, the prepared meat has a residual nitrite content of 30 to 70 ppm, preferably 32-68 ppm, preferably 35-65 ppm, preferably 40-60 ppm, preferably 45-55 ppm, preferably 50-55 ppm relative to a total weight of the prepared meat. In a preferred embodiment, the prepared meat has a residual nitrite content of 66.70 parts per million relative to a total weight of the prepared meat.

In some embodiments, the prepared meat has a residual nitrite content of 20 to 60 parts per million, preferably 22-58 ppm, preferably 25-55 ppm, preferably 30-50 ppm, preferably 35-45 ppm, preferably 40-43 ppm relative to a total weight of the prepared meat after 21 days. In a preferred embodiment, the prepared meat has a residual nitrite content of 55.38 parts per million relative to a total weight of the prepared meat after 21 days.

In some embodiments, the prepared meat has a nitrosamine concentration ranging from 20 to 35 ng/mL, preferably 22-34 ng/ml, preferably 23-33 ng/ml, preferably 24-32 ng/mL, preferably 25-30 ng/mL, preferably 28-35 ng/ml, preferably 27.5 to 30 ng/ml. In a preferred embodiment, the prepared meat has a nitrosamine concentration of 29.54 ng/ml.

The following examples are provided solely for illustration and are not to be construed as limitations of the present disclosure, as many variations thereof are possible without departing from the spirit and scope of the present disclosure.

EXAMPLES

The following examples demonstrate a method of fabricating a plant-based additive for inhibiting nitrite formation during meat preparation as described herein. The examples are provided solely for illustration and are not to be construed as limitations of the present disclosure, as many variations thereof are possible without departing from the spirit and scope of the present disclosure.

Example 1: Materials

Pomegranate peels (*Punica granatum* L.) were sourced from a local market in Fayoum Governorate, Egypt. The peels were separated from the fruit, washed with tap water, dried in a vacuum oven, and then ground into powder. The pomegranate peel powder was stored in sealed vials at room temperature until needed. Red cabbage and beetroot (varieties unspecified) were purchased from the local market in Fayoum Governorate, Egypt. The vegetables were washed with distilled water, dried at 40° C., ground into powder, and stored in the freezer until use. Beef and beef fat were purchased from the local market in Fayoum Governorate, Egypt. Spices were also obtained from the local market.

Example 2: Synthesis of Zinc Oxide Nanoparticles from Pomegranate Peel Extract (PPE)

Pomegranate peel extract (PPE) was prepared following the method described in literature [See: Abdelmigid, H. M., Morsi, M. M., Hussien, N. A., Alyamani, A. A., & Al Sufyani, N. M. (2021). *Comparative analysis of nanosilver particles synthesized by different approaches and their antimicrobial efficacy. Journal of nanomaterials,* 2021, 1-12, incorporated herein by reference in its entirety]. Briefly, 5.0 mL of the extract was combined with 95.0 mL of a 0.01 M zinc acetate dehydrate solution (Zn $(C_2H_3O_2)_2 \cdot 2H_2O$). The mixture was continuously stirred for one hour at 70° C. After this incubation period, the resulting precipitate was centrifuged for 30 minutes at 3000 rpm. The precipitate was washed with distilled water, and the supernatant was decanted. The pellets were transferred to petri dishes and left to dry overnight at 40° C. [See: Naseer, M., Aslam, U., Khalid, B., & Chen, B. (2020). *Green route to synthesize Zinc Oxide Nanoparticles using leaf extracts of Cassia fistula and Melia azadarach and their antibacterial potential. Scientific Reports,* 10(1), 9055, incorporated herein by reference in its entirety].

Example 2: Preparation of Red Cabbage and Beetroot Nanoparticles

Red cabbage and beetroot were processed into nanoparticles using a top-down ball milling method. The materials were placed in a stainless-steel container with ceramic balls (1.11 to 1.75 cm in diameter) at a mass ratio of 10:1. The mixture was milled for 24 hours at 900 revolutions per minute (rpm) using a ball mill (Photon, Egypt) to achieve the desired nanoparticle size.

Example 3: Preparation of Zinc Oxide-Red Cabbage and Beetroot Nanocomposite (ZnO-RC and BR NCs)

Zinc oxide-red cabbage and beetroot nanocomposite (ZnO—RC and BR NCs) were prepared using a green synthesis approach. ZnO nanoparticles were mixed with 5 grams of red cabbage and beetroot nanoparticles in a beaker and stirred for 24 hours at 25° C. The mixture was centrifuged, and the supernatant was discarded, repeating this process four times. The final product was washed five times with 50 mL of ethanol. The ZnO—RC and BR nanocomposites were dried at 50° C. and stored in a glass vial at room temperature.

Example 4: Preparation of Beef Kofta

Following the method described in literature [See: Hosny, E., Amin, R., & Nassif, M. Z. (2020). *Antioxidant, Sensory and Antibacterial activities of some Essential oils in Beef Kofta. Benha Veterinary Medical Journal,* 38(1), 29-34, incorporated herein by reference in its entirety], 3 kg of beef was minced and stored in sterile plastic bags. Samples of beef kofta were prepared with the following composition: 70% meat, 12% fat, 9% flour, 2.1% common salt, 1.2% onion, 1% garlic powder, and a variety of spices (1.2%), as detailed in Table 1.

TABLE 1

| Composition of Beef Kofta formulas | |
| --- | --- |
| Ingredients | (%) of Ingredients in Beef Kofta |
| Meat | 70 |
| Fat | 12 |
| Flour | 9 |
| Salt (NaCl) | 2.1 |

TABLE 1-continued

| Composition of Beef Kofta formulas | |
| --- | --- |
| Ingredients | (%) of Ingredients in Beef Kofta |
| Onion powder | 1.2 |
| garlic powder | 1 |
| Spices | 1.2 |

Beef meatballs were prepared by blending minced meat, flour, salt, onion, garlic powder, and spices to create meat dough, which was then divided into two groups. The first group (250 g) remained untreated as the control, while the second group (also 250 g) was further divided into three subgroups, each mixed with specific additives: sodium nitrite ($NaNO_2$) at 150 ppm, zinc oxide nanoparticles with red cabbage (2.0%), and zinc oxide nanoparticles with beetroot (2%) plus zinc nanoparticles. The dough was shaped into round balls manually to form raw meat kofta, which were then packed in polyethylene bags, labeled, and stored at 4° C.

Example 5: Chemical Analyses

Moisture Content: Moisture content was determined by drying the sample in a vacuum oven at 105±1° C. until a constant weight was achieved, following the method described in literature [See: AOAC (2012). *Official Methods of Analysis of the Association of Analytical Chemists.* 18th Ed., Washington, D.C., USA, incorporated herein by reference in its entirety].

Total Nitrogen Content (T.N.): Total nitrogen was measured using the macro Kjeldahl method as outlined by procedure described in literature [See: AOAC (2012). *Official Methods of Analysis of the Association of Analytical Chemists.* 18th Ed., Washington, D.C., USA, incorporated herein by reference in its entirety]. Crude protein content was calculated using the equation: T.N.×6.25.

Fat Content: Crude fat was extracted using petroleum ether for 16 hours via Soxhlet apparatus, as recommended by procedure described in literature [See: AOAC (2012). *Official Methods of Analysis of the Association of Analytical Chemists.* 18th Ed., Washington, D.C., USA, incorporated herein by reference in its entirety].

Ash Content: Ash content was determined according to procedure described in literature [See: AOAC (2012). *Official Methods of Analysis of the Association of Analytical Chemists.* 18th Ed., Washington, D.C., USA, incorporated herein by reference in its entirety]. Minced samples were weighed in a 50 ml porcelain dish and dried at 100° C. to expel moisture. Samples were then placed in an electric muffle furnace at 525° C. until white ash was obtained.

Carbohydrates Content (Nitrogen-Free Extract): Carbohydrates content was calculated using the subtractive method with the following equation:

$$100-(Moisture+protein+fat+ash).$$

Energy value: Energy value was calculated by multiplying the percentages of protein and carbohydrate by 4, and the fat content percentage by 9. Energy value is presented as Cal/100 g by procedure described in literature [See: Atwater, W. O., Woods, C. D., & Bryant, A. P. (1906). *The chemical composition of American food materials* (No. 28). US government printing office, incorporated herein by reference in its entirety].

Total Volatile Nitrogen (T.V.N): Total volatile nitrogen was determined using the Okoloff's magnesium oxide distillation volumetric method described by procedure described in literature [See: AOAC (2012). *Official Methods of Analysis of the Association of Analytical Chemists*. 18th Ed., Washington, D.C., USA, incorporated herein by reference in its entirety].

Thiobarbituric Acid (T.B.A. value): Thiobarbituric acid value, an index of fat oxidation, was determined using the method described by procedure described in literature [See: Zhang, Y., Holman, B. W., Ponnampalam, E. N., Kerr, M. G., Bailes, K. L., Kilgannon, A. K., and Hopkins, D. L. (2019). *Understanding beef flavour and overall liking traits using two different methods for determination of thiobarbituric acid reactive substance* (*TBARS*). *Meat science*, 149, 114-119, incorporated herein by reference in its entirety]. A 10 g sample was analyzed calorimetrically, and results were presented as absorbance at 538 nm. TBA content was calculated as mg TBA=Absorbance×7.8.

Water Holding Capacity (WHC): Water holding capacity and plasticity were measured according to procedure described in literature [See: Grau, R. and Hamm, F. (1957). "*Uber das wasser binding svermogen des sausagetier muckels*". *Uber die bestimmg der wasser bindung des muscles, Z. Lebensumittel untersuch. Und Forschung*, 105, 446-460. C. F., El-Bedewy, L., *Production and evaluation of different kinds of sausage Meat Analogues*, Ph. D. Thesis, Faculty of Agric., Cairo University, (1984), incorporated herein by reference in its entirety]. A sample of 0.3 g of minced meat was placed under an ash less filter paper (Whitman No. 41) and pressed for 10 minutes using a 1.0 kg weight. The surface areas of the two zones formed on the filter paper were determined using a plan meter. The area of the outer zone indicated the WHC in cm$^2$. Each cm$^2$ of outer zone area corresponds to 8.4 mg of free water. Bound water percentage of moisture content was calculated as follows:

$$\text{Bound water \% of moisture content} = \frac{\text{moisture content} - \frac{(8.4 \times \text{cm}^2\text{outer zonarea}) \times 100}{1000 \times 0.3}}{\text{moisture content}} \times 100$$

Cooking loss: Cooking loss was determined according to[17]. It was measured after grilling beef burger samples, calculated as follows:

$$\text{Cooking loss \%} = \frac{\text{Raw sample weight} - \text{cooked sample weight} \times 100}{\text{Raw sample weight}}$$

Cooking yield: Cooking yield was calculated according to procedure described in literature [See: El-Nemr, S. E. A. (1979) *Studies on Meat Substitutes*, M. Sc. Thesis, Faculty of Agric., Zagazig Univ., Zagazig, Egypt, incorporated herein by reference in its entirety].

Cooking yield %=100–Cooking loss %

Determination of Nitrite: Residual nitrite levels in tested plant powders and beef kofta samples were determined (as mg NaNO$_2$/kg sample) using a spectrophotometer (model: CT2200-s/n: RE1310004-Germany) at 540 nm, following the method described in literature [See: AOAC., 2000. *Official method of analysis*. 17th Edition. Association of Official Analytical Chemists; Washington, DC, USA, incorporated herein by reference in its entirety].

Determination of Nitrate: Nitrate content in tested plant powders and beef kofta samples was measured using the same spectrophotometer at 407 nm, according to the method described by procedure described in literature [See: Tanaka, A., N. Nose and H. Iwasaki, 1982. *Spectrophotometric determination of nitrate in vegetable products using 2-sec-butylphenol. Analyst*, 107(1271): 190-194, incorporated herein by reference in its entirety].

Determination of Nitrosamine: For the determination of nitrosamines, a blank was prepared using Milli-Q water. The mobile phase A consisted of 1.0 mL formic acid mixed with 999 mL Milli-Q water, while mobile phase B was 1.0 mL formic acid mixed with 999 mL methanol. The extraction of N-nitrosamines was performed according to the method described by procedure described in literature [See: Al-Kaseem, M., Z. Al-Assaf and F. Karabet, 2013. *Rapid and simple extraction method for volatile nnitrosamines in meat products. Pharmacology and Pharmacy*, 4(08): 611-618, incorporated herein by reference in its entirety].

Chromatographic Investigations

LC parameters: Chromatographic analysis was performed using an ExionL CTM AC system coupled with a SCIEX Triple Quadrupole 5500+ Mass Spectrometer, employing a Kinetex® F5 100 Å LC Column (4.6×100 mm, 2.6 µm) for separation. The mobile phases included 0.1% formic acid in water (Phase A) and 0.1% formic acid in methanol (Phase B), with a gradient elution method: 0-2 minutes at 90% A and 10% B, transitioning to 10% A and 90% B from 2 to 7 minutes, then holding at 10% A and 90% B from 7 to 8.1 minutes, and finally returning to 90% A and 10% B from 8.1 to 13 minutes. The flow rate was maintained at 0.4 mL/min, with a total run time of 13 minutes and an injection volume of 10 µL. The column temperature was set to 40° C., while the autosampler temperature was kept at 15° C., ensuring optimal separation and sensitivity for the target analyses.

MS parameters: Mass spectrometry analysis was conducted using the APCI (Atmospheric Pressure Chemical Ionization) ionization mode, which is well-suited for compounds with moderate polarity. For targeted quantification, a Multiple Reaction Monitoring (MRM) scan type was employed, enabling the specific detection of analyses by monitoring transitions from precursor ions to product ions. The analysis utilized positive polarity, which is generally effective for a wide range of analyses, ensuring accurate and reliable quantification of the target compounds.

MS/MS Parameters: The MS/MS parameters outlined in Table 2 specify the conditions used for the Multiple Reaction Monitoring (MRM) analysis. For each analysis, two ion transitions are monitored: a precursor ion (Q1) and a product ion (Q3). The dwell time for each transition is set at 250 milliseconds, ensuring adequate data acquisition. The declustering potential (DP) is uniformly set at 40 volts, while the entrance potential (EP) is maintained at 10 volts. Collision energy (CE) and collision cell exit potential (CXP) are individually optimized for each transition to enhance sensitivity and specificity. Additional settings include a curtain gas (CUR) flow rate of 20.0 units, a collision gas (CAD) flow rate of 6.0 units, a nebulizer current (NC) of 3.0 units, and a source temperature of 450.0° C. These parameters collectively ensure optimal performance of the mass spectrometer for targeted analysis.

TABLE 2

| Q1 (m/z) | Q3 (m/z) | Dwell time (msec) | DP (V) | EP (V) | CE (V) | CXP (V) |
|---|---|---|---|---|---|---|
| | | | MS/MS Parameters: | | | |
| 103.047 | 29.037 | 250 | 40 | 10 | 21 | 14 |
| 103.047 | 75.010 | 250 | 40 | 10 | 12 | 8 |
| 75.048 | 44.000 | 250 | 40 | 10 | 17 | 20 |
| 75.048 | 58.080 | 250 | 40 | 10 | 15 | 8 |
| 147.008 | 117.000 | 250 | 46 | 10 | 9 | 8 |
| 147.008 | 44.000 | 250 | 46 | 10 | 17 | 22 |
| Curtain Gas (CUR) | | | | | 20.0 | |
| Collision Gas (CAD) | | | | | 6.0 | |
| Nebulizer Current (NC) | | | | | 3.0 | |
| Source Temperature | | | | | 450.0 | |

Nitrate and nitrite content in the tested plant powders; From Table 3 the nitrate content in beet root powder is significantly higher compared to red cabbage powder. Specifically, beet root powder contains 894.00 ppm (parts per million) of nitrates, while red cabbage powder contains 678.29 ppm. This difference highlights that beet root powder is a richer source of nitrates compared to red cabbage powder. Keeton et. al. [See: Keeton, J. T., W. Osburn, M. D. Hardin, M. T. Longnecker and N. S. Bryan, 2009. *A national survey of the nitrite/nitrate concentrations in cured meat products and non-meat foods available at retail. Des Moines: American Meat Institute Foundations, pp:* 1-74, incorporated herein by reference in its entirety] found that the nitrate contents of beet roots powder were from 480-2000 ppm. In contrast to nitrates, the nitrite content is slightly higher in red cabbage powder than in beet root powder. Red cabbage powder contains 6.91 ppm of nitrites, whereas beet root powder contains 4.89 ppm. Although both values are relatively low, this indicates that red cabbage has a marginally higher concentration of nitrites [See: Shah, I., A. Petroczi, R. A. James and D. P. Naughton, 2013. *Determination of nitrate and nitrite content of dietary supplements using ion chromatography. J. of Analytical and Bioanalytical Techniques,* 12(3): 1-7; and Raczuk, J., W. Wadas and K. Glozak, 2014. *Nitrates and nitrites in selected vegetables purchased at supermarkets in Siedlce, Poland. Roczniki Państwowego Zakladu Higieny,* 65(1): 15-20, incorporated herein by reference in its entirety] they found that, the nitrite contents of red beet powders were from 2.50 to 15.0 ppm.

TABLE 3

| Content | Beet root powder | Red cabbage powder |
|---|---|---|
| | Nitrate and nitrite content in the tested plant powders | |
| nitrate (ppm) | 894.00 | 678.29 |
| nitrite (ppm) | 4.89 | 6.91 |

Figure 2:
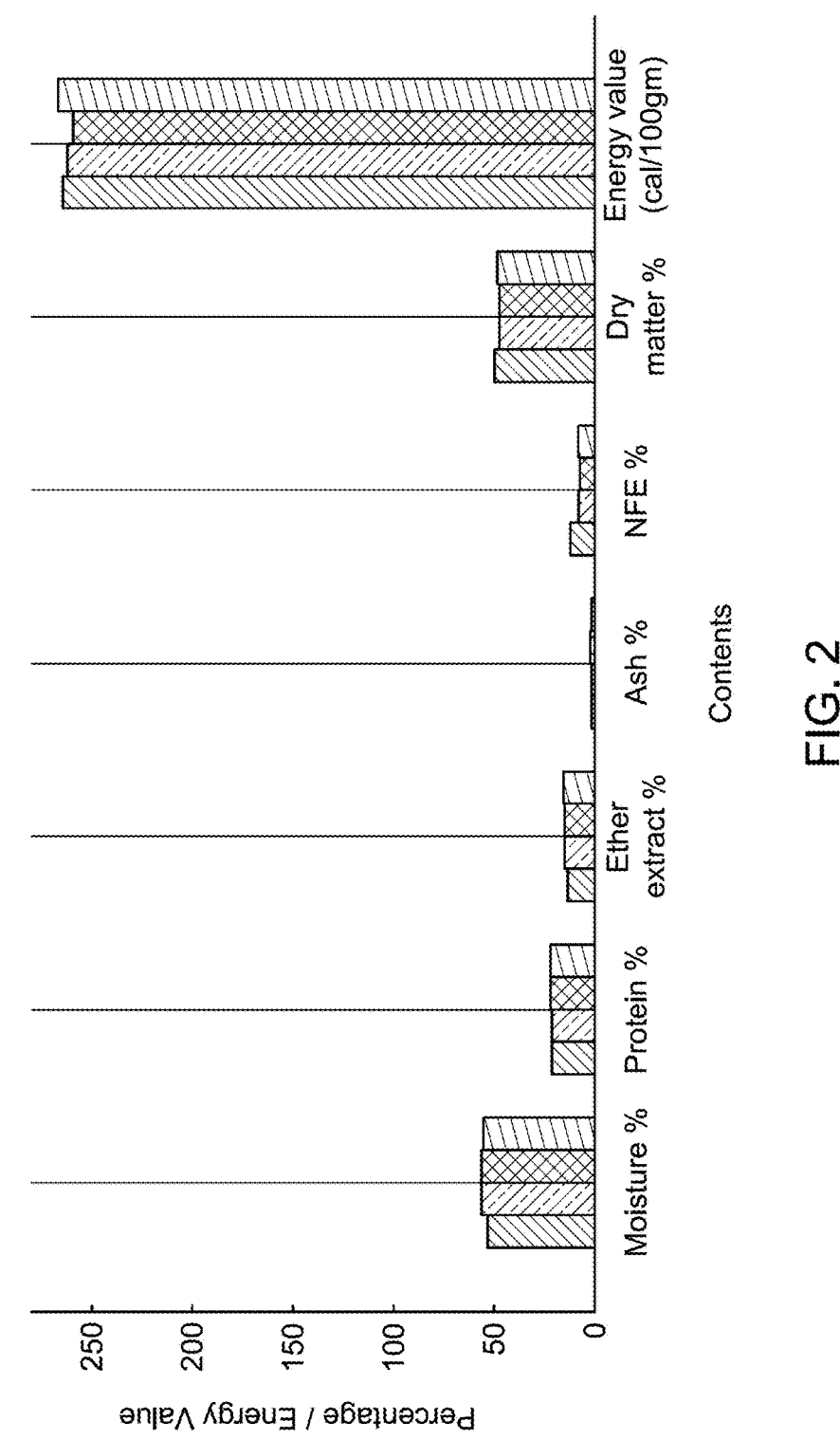
FIG. 2 is a bar graph depicting the nutritional composition and energy values of samples exposed to different treatments, control, $NaNO_2$ (150 ppm), RC ZnONP2%, and BR ZnONP2%, according to certain embodiments.

Chemical Composition of Beef Kofta (Wet Weight Basis) During Refrigerated Storage for 21 Days: Table 4 and FIG. 2 presents the chemical composition of beef kofta stored at refrigerated temperatures for 21 days. The moisture content varied slightly among the samples, with the control sample exhibiting the lowest moisture content at 52.06%. In contrast, samples treated with NaNO$_2$ (150 ppm), RC ZnONP 2%, and BR ZnONP 2% showed slightly higher moisture contents of 54.08%, 54.10%, and 53.64%, respectively. Protein content remained relatively stable across all samples, ranging from 21.08% in the control to 21.64% in the BR ZnONP 2% sample, indicating minimal impact of the treatments on protein levels. The ether extract, which indicates fat content, was highest in the BR ZnONP 2% sample at 15.31%, followed by RC ZnONP 2% at 14.89%, and NaNO$_2$ (150 ppm) at 14.86%. The control sample had the lowest fat content at 13.62%. Ash content was slightly higher in the RC ZnONP 2% sample at 2.38%, while other samples ranged between 1.59% and 1.64%. The NFE (Nitrogen-Free Extract), representing carbohydrates and other non-nitrogenous compounds, was highest in the control sample at 11.60%, compared to the lowest value of 7.03% in the RC ZnONP 2% sample. Dry matter content, which reflects all non-water components, was highest in the control sample at 47.93%, with slightly lower values in the treated samples: BR ZnONP 2% at 46.35%, NaNO$_2$ (150 ppm) at 45.91%, and RC ZnONP 2% at 45.89%. Energy value, measured in calories per 100 grams, varied slightly among the samples. The BR ZnONP 2% sample had the highest energy value at 255.58 cal/100 g, followed by the control at 253.39 cal/100 g, NaNO$_2$ (150 ppm) at 251.47 cal/100 g, and the RC ZnONP 2% sample at 248.52 cal/100 g. Overall, the addition of NaNO$_2$, RC ZnONP, and BR ZnONP influenced the moisture, fat, ash, NFE, and energy values of beef kofta during refrigerated storage. Each treatment resulted in slightly higher moisture and fat content while reducing dry matter content. The energy value was marginally affected, with the BR ZnONP 2% sample exhibiting the highest caloric content.

TABLE 4

| Content | Moisture % | Protein % | Ether extract % | Ash % | NFE % | Dry matter % | Energy value (cal/ 100 gm) |
|---|---|---|---|---|---|---|---|
| | Chemical composition of beef kofta (wet weight basis) during refrigerated storage for 21 days | | | | | | |
| Control | 52.06 | 21.08 | 13.62 | 1.64 | 11.6 | 47.93 | 253.39 |
| NaNo$_2$ (150 ppm) | 54.08 | 21.3 | 14.86 | 1.62 | 8.12 | 45.91 | 251.47 |
| RC ZnONP2% | 54.1 | 21.58 | 14.89 | 2.38 | 7.03 | 45.89 | 248.52 |
| BR ZnONP2% | 53.64 | 21.64 | 15.31 | 1.59 | 7.8 | 46.35 | 255.58 |

Figures 3, 4:
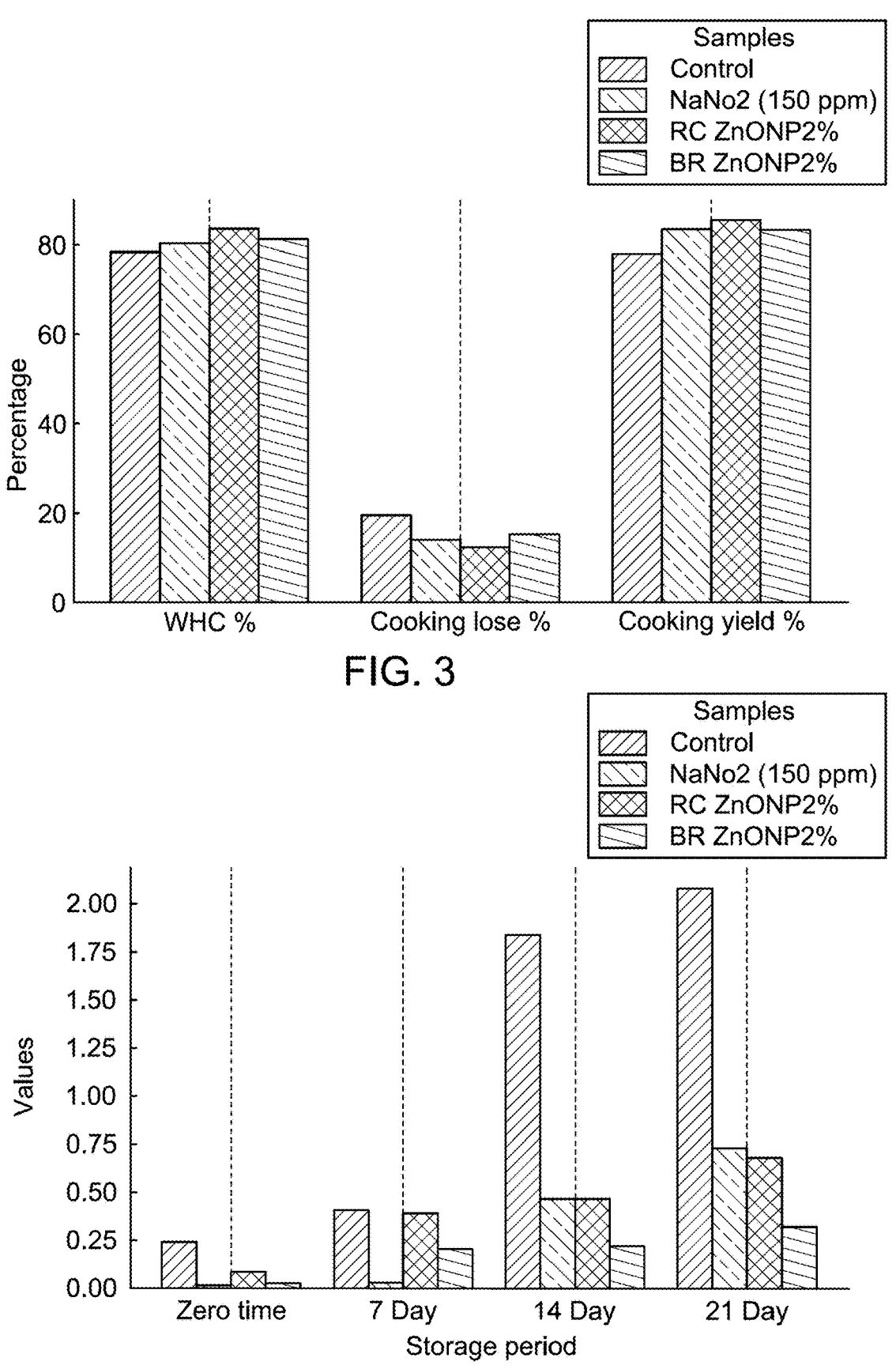
FIG. 3 compares water-holding capacity (WHC), cooking loss, and cooking yield for samples treated with different additives, according to certain embodiments.
FIG. 4 shows changes in thiobarbituric acid (TBA) values over different storage periods for samples treated with various additives, according to certain embodiments.

Physical Properties of Beef Kofta (Wet Weight Basis) During Refrigerated Storage for 21 Days: Table 5 and FIG. 3 presents the physical properties of beef kofta (wet weight basis) during refrigerated storage for 21 days. Water Holding Capacity (WHC) measures the ability of beef kofta to retain water during cooking and processing. The control sample exhibited the lowest WHC at 80.45%, while the sample treated with RC ZnONP 2% demonstrated the highest WHC at 85.34%. This was followed by NaNO$_2$ (150 ppm) at 82.45% and BR ZnONP 2% at 83.21%, indicating that the treatments, especially RC ZnONP 2%, significantly enhanced water retention capacity. Cooking loss, which reflects the weight lost during cooking due to water and fat evaporation, was highest in the control sample at 20.08%, indicating substantial weight reduction during cooking. In contrast, the RC ZnONP 2% sample had the lowest cooking loss at 12.57%, followed by NaNO$_2$ (150 ppm) at 14.61% and BR ZnONP 2% at 15.91%. These results show that the treated samples, particularly RC ZnONP 2%, retained more weight during cooking compared to the control. Cooking yield, defined as the percentage of the initial weight retained after cooking, was lowest in the control sample at 79.82%, correlating with its high cooking loss. The highest cooking yield was observed in the RC ZnONP 2% sample at 87.42%, followed by $NaNO_2$ (150 ppm) at 85.38% and BR ZnONP 2% at 84.68%. This indicates that the treatments, particularly RC ZnONP 2%, improved cooking yield, likely due to better water retention and reduced cooking loss. Overall, the addition of $NaNO_2$ (150 ppm), RC ZnONP 2%, and BR ZnONP 2% enhanced the physical properties of beef kofta during refrigerated storage. All treated samples showed higher WHC and cooking yield, along with reduced cooking loss compared to the control. The RC ZnONP 2% treatment was especially effective, resulting in the highest WHC and cooking yield, and the lowest cooking loss among all samples. These findings indicate that RC ZnONP 2% could be a beneficial treatment for improving the physical properties of beef kofta during storage and cooking.

TABLE 5

| Physical properties of beef kofta (wet weight basis) during refrigerated storage for 21 days | | | |
|---|---|---|---|
| Content | WHC % | Cooking loss % | Cooking yield % |
| Control | 80.45 | 20.08 | 79.82 |
| $NaNO_2$ (150 ppm) | 82.45 | 14.61 | 85.38 |
| RC ZnONP2% | 85.34 | 12.57 | 87.42 |
| BR ZnONP2% | 83.21 | 15.91 | 84.68 |

Thiobarbituric Acid (TBA) values and lipid oxidation in beef kofta during refrigerated storage: The control sample exhibited significantly higher TBA values throughout the storage period, indicating greater lipid oxidation and spoilage, as shown in Table 6 and FIG. 4. In contrast, all treated samples ($NaNO_2$, RC ZnONP 2%, and BR ZnONP 2%) demonstrated much lower TBA values, highlighting their effectiveness in preventing oxidation and preserving meat quality. Both $NaNO_2$ and ZnONP treatments (RC and BR) significantly reduced TBA values compared to the control, indicating decreased lipid oxidation. Notably, the ZnONP treatments, particularly BR ZnONP 2%, showed a stronger ability to inhibit oxidation than $NaNO_2$, evidenced by lower TBA values. The BR ZnONP 2% sample was more effective in reducing TBA values compared to RC ZnONP 2%, indicating a stronger antioxidative effect and better protection against lipid oxidation and spoilage throughout the storage period. Overall, the TBA values indicate that the use of ZnONP, especially BR ZnONP 2%, was the most effective in inhibiting lipid oxidation and maintaining the quality of beef kofta during refrigerated storage for 21 days. While $NaNO_2$ and RC ZnONP 2% also contributed to reducing oxidation, they were slightly less effective than BR ZnONP 2%. These treatments significantly extended the shelf life of beef kofta compared to the untreated control, which exhibited rapid oxidation and spoilage.

TABLE 6

| Changes in TBA values of beef kofta samples during refrigerated storage for 21 days. | | | | |
|---|---|---|---|---|
| Content | Zero time | 7 Days | 14 days | 21 days |
| Control | 0.2418 | 0.4056 | 1.833 | 2.072 |
| $NaNO_2$ (150 ppm) | 0.01326 | 0.0312 | 0.4691 | 0.7279 |
| RC ZnONP2% | 0.0858 | 0.390 | 0.468 | 0.6771 |
| BR ZnONP2% | 0.0234 | 0.2028 | 0.2184 | 0.3198 |

Figures 5, 6:
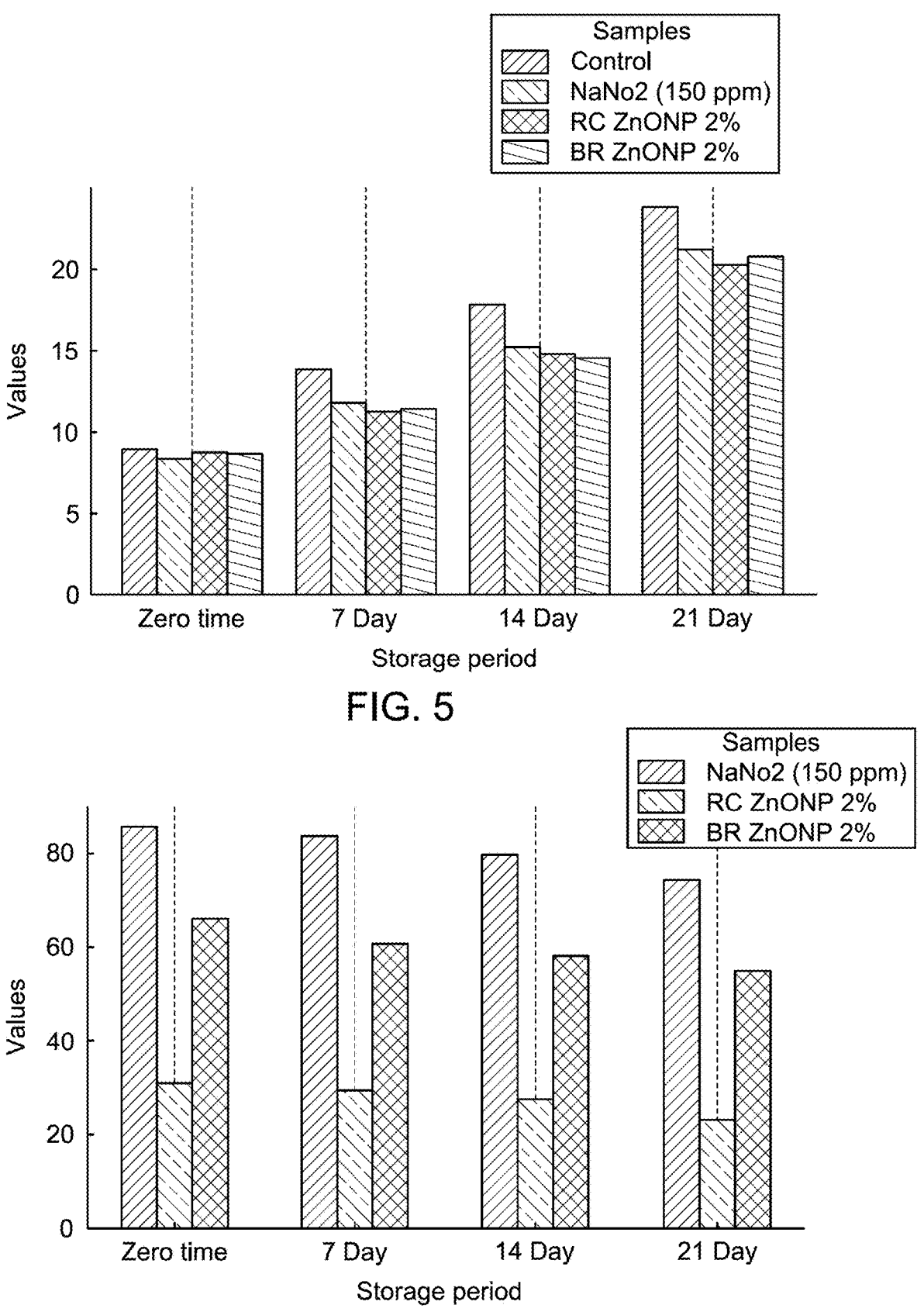
FIG. 5 shows changes in total volatile nitrogen (TVN) values of beef kofta samples over different storage periods for samples treated with various additives, according to certain embodiments.
FIG. 6 shows changes in residual nitrite content in beef kofta samples over different storage periods for samples treated with various additives, according to certain embodiments.

Changes in TVN Values of Beef Kofta Samples during Refrigerated Storage for 21 Days: Table 7 and FIG. 5 presents the changes in Total Volatile Nitrogen (TVN) values of beef kofta samples during refrigerated storage for 21 days. The TVN values in the control sample increased significantly over the storage period, rising from 8.80 at zero time to 23.45 by day 21. This sharp increase indicates high levels of protein degradation and microbial activity, leading to spoilage. In contrast, the TVN values for the $NaNO_2$-treated sample increased more gradually, from 8.20 initially to 20.87 at 21 days. This slower rise indicates that $NaNO_2$ was somewhat effective in reducing spoilage and controlling protein degradation. The RC ZnONP 2% treated sample also showed a gradual increase in TVN values, from 8.60 at zero time to 20.00 by day 21, indicating its ability to inhibit protein degradation and spoilage. The BR ZnONP 2% sample experienced the lowest increase in TVN values, rising from 8.50 at zero time to 20.45 by day 21. This finding indicates that BR ZnONP 2% was the most effective treatment in reducing protein breakdown and controlling spoilage throughout the storage period. Overall, all treated samples ($NaNO_2$, RC ZnONP 2%, and BR ZnONP 2%) exhibited lower TVN values compared to the control, indicating reduced protein degradation and spoilage. Among these, BR ZnONP 2% was particularly effective in maintaining lower TVN levels, highlighting its superior ability to preserve meat quality during refrigerated storage.

TABLE 7

| Changes in the TVN values of beef kofta samples during refrigerated storage for 21 days. | | | | |
|---|---|---|---|---|
| Contents | Zero time | 7 Days | 14 days | 21 days |
| Control | 8.80 | 13.60 | 17.56 | 23.45 |
| $NaNO_2$ (150 ppm) | 8.20 | 11.6 | 15 | 20.87 |
| RC ZnONP 2% | 8.60 | 11.08 | 14.57 | 20.00 |
| BR ZnONP 2% | 8.50 | 11.20 | 14.31 | 20.45 |

Residual Nitrite Content in Beef Kofta Samples during Refrigerated Storage for 21 Days: The residual nitrite ($NO_2$) content in the beef kofta samples varied with different treatments over the 21-day storage period are shown in Table 8 and FIG. 6. In the $NaNO_2$ (150 ppm) treated sample, nitrite levels showed a gradual decline, starting at 86.43 ppm at zero time and decreasing to 84.49 ppm at 7 days, 80.48 ppm at 14 days, and 75.01 ppm by day 21. This consistent reduction indicates ongoing chemical reactions involving nitrites, such as oxidation and interactions with meat components. The RC ZnONP 2% treated sample had a lower initial nitrite content of 31.12 ppm, which decreased to 29.71 ppm at 7 days, 27.71 ppm at 14 days, and 23.35 ppm by day 21. The smaller residual nitrite amounts indicate that RC ZnONP may facilitate the breakdown of nitrites, potentially due to its interaction with the meat matrix or a catalytic effect. The BR ZnONP 2% sample began with a higher residual nitrite content of 66.70 ppm, which decreased to 61.18 ppm at 7 days, 58.72 ppm at 14 days, and 55.38 ppm by day 21. While this moderate reduction parallels the trend seen with RC ZnO NP, it indicates that BR ZnONP also plays a role in nitrite reduction, albeit less effectively. Research indicates that nitrite levels in meat products typically decrease during storage due to reactions with meat components, such as myoglobin and fat oxidation products. The use of ZnO NP, particularly RC ZnO NP 2%, appears promising for more effectively reducing residual nitrite levels compared to traditional sodium nitrite, potentially enhancing food safety and quality. Supporting literature highlights that nitrites undergo various chemical reactions during meat processing, leading to a gradual decrease in residual levels over time. Additionally, it was noted that proper storage conditions significantly impact nitrite reduction [See: Zhou, G. H., Xu, X. L., & Liu, Y. (2010). *Preservation technologies for fresh meat—A review. Meat Science,* 86(1), 119-128, incorporated herein by reference in its entirety]. Sirelkhatim et. al., [See: Sirelkhatim, A., Mahmud, S., Seeni, A., Kaus, N. H. M., Ann, L. C., Bakhori, S. K. M., Hasan, H., & Mohamad, D. (2015). *Review on zinc oxide nanoparticles: Antibacterial activity and toxicity mechanism. Nano-Micro Letters,* 7(3), 219-242, incorporated herein by reference in its entirety] discussed the antibacterial properties of zinc oxide nanoparticles, which may disrupt bacterial membranes and generate reactive oxygen species, thereby contributing to nitrite reduction. Furthermore, it was demonstrated that ZnO NP in packaging could extend food shelf life by reducing microbial growth [See: Emamifar, A., Kadivar, M., Shahedi, M., & Soleima-nian-Zad, S. (2011). *Evaluation of nanocomposite packaging containing Ag and ZnO on the shelf life of fresh orange juice. Innovative Food Science & Emerging Technologies,* 12(4), 583-589]. According to literature different curing agents and additives significantly affect nitrite levels in meat products [See: Sebranek, J. G., Jackson-Davis, A. L., Myers, K. L., & Lavieri, N. A. (2012). *Beyond celery and starter culture: Advances in natural/organic curing processes in the United States. Meat Science,* 92(3), 267-273, incorporated herein by reference in its entirety]. This aligns with the current findings, where RC ZnO NP 2% was more effective than BR ZnO NP 2% in reducing nitrite content, emphasizing the importance of the formulation and type of additive in nitrite reduction.

TABLE 8

Residual nitrite (NO$_2$) content (ppm) of different beef kofta treatments as affected by different additives and their percentages during refrigerated storage for 21 days

| Time intervals | NaNO$_2$ (150 ppm) | RC-ZnONP 2% | BR-ZnONP 2% | Time intervals |
|---|---|---|---|---|
| Zero time | 86.43 | 31.12 | 66.70 | 86.43 |
| 7 day | 84.49 | 29.71 | 61.18 | 84.49 |
| 14 day | 80.48 | 27.71 | 58.72 | 80.48 |
| 21 day | 75.01 | 23.35 | 55.38 | 75.01 |

Figure 7:
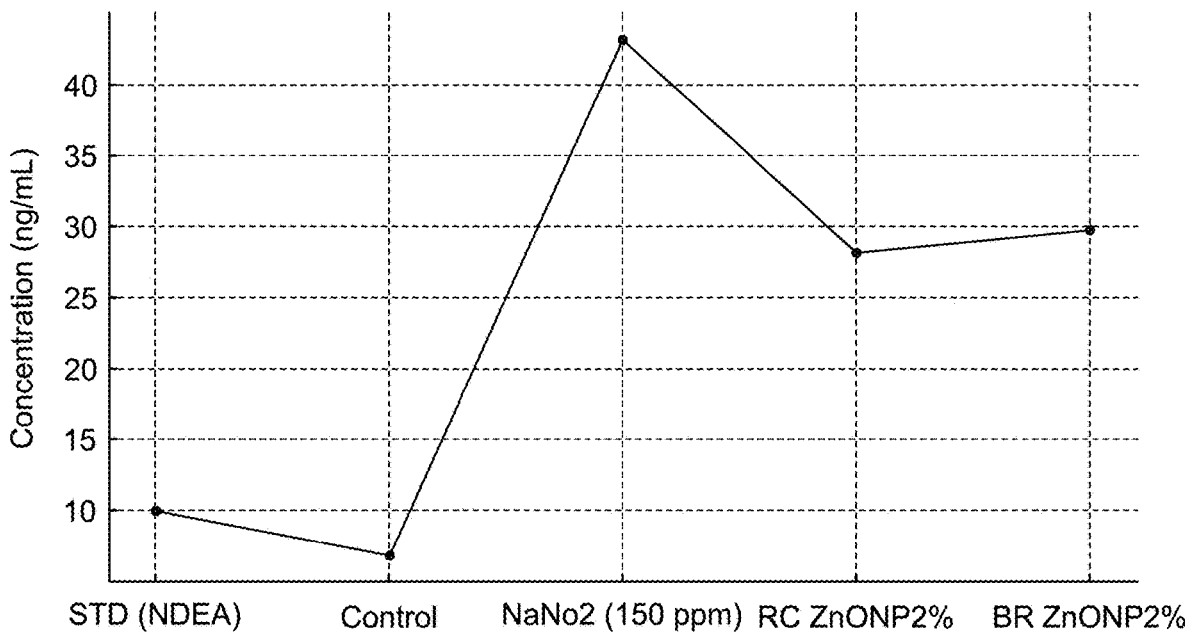
FIG. 7 compares the concentrations (ng/ml) of different samples, standard (NDEA), Control, $NaNO_2$ (150 ppm), RC ZnONP2%, and BR ZnONP2%, according to certain embodiments.

Effect of Different Additives on Nitrosamine (NDEA) Levels in Grilled Beef Kofta: The nitrosamine (NDEA) concentrations in grilled beef kofta varied significantly with different additives as shown in Table 9 and FIG. 7. The control sample, which contained no additives, recorded a baseline nitrosamine concentration of 6.89 ng/ml with an area of 1.04E+05, representing the natural level of nitrosamine formation in the absence of preservatives. Among the treated samples, the NaNO$_2$ treated sample exhibited the highest NDEA concentration at 42.78 ng/mL, with an area of 6.46E+05. This substantial increase indicates that sodium nitrite can promote nitrosamine formation during grilling, likely due to the conversion of nitrites to nitrosamines under high temperatures. In contrast, the RC ZnONP 2% treated sample had a reduced NDEA concentration of 27.95 ng/mL, with an area of 4.22E+05. This indicates that the addition of RC ZnONP effectively inhibited nitrosamine formation compared to the NaNO$_2$ sample. The BR ZnONP 2% treated sample displayed an NDEA concentration of 29.54 ng/mL and an area of 4.46E+05. Although this concentration is slightly higher than that of RC ZnONP 2%, it remains significantly lower than that of the NaNO$_2$ sample, indicating a reduction in nitrosamine formation, albeit less effectively than RC ZnONP. Overall, RC ZnONP 2% proved to be more effective in minimizing nitrosamine production compared to BR ZnONP 2%, though both were significantly more effective than NaNO$_2$. These findings indicates that the type and formulation of zinc oxide nanoparticles can play a crucial role in reducing nitrosamine levels during cooking, highlighting their potential as safer alternatives to traditional preservatives. This study thoroughly investigated the effects of zinc oxide nanoparticles (ZnO NP) and plant-based powders (beetroot and red cabbage) as natural nitrate sources on nitrosamine formation and quality attributes in beef kofta. The results are promising, highlighting the potential of these natural additives as alternatives to synthetic nitrites used in meat processing. The addition of ZnO NP, especially when combined with beetroot powder, significantly reduced nitrosamine levels, with treated samples showing concentrations as low as 29.54 ng/mL much lower than those with synthetic nitrites. This indicates that these natural additives could help minimize the formation of potentially carcinogenic compounds in processed meats. Furthermore, the study demonstrated that ZnO NP and plant powders effectively decreased lipid oxidation, as evidenced by lower Thiobarbituric Acid (TBA) values, particularly with the BR ZnO NP 2% treatment, which exhibited strong antioxidative effects. Improved physical properties were also observed in treated beef kofta, including higher water-holding capacity and reduced cooking loss, which enhance juiciness and texture critical factors for consumer acceptability. Additionally, treated samples exhibited lower total volatile Nitrogen (TVN) values, indicating reduced protein degradation, with BR ZnONP 2% being the most effective in maintaining meat quality during storage. Overall, the findings indicate that ZnONP and plant powders could revolutionize the meat processing industry by providing a natural and effective alternative to synthetic nitrites, meeting consumer demand for healthier food products. Future research should focus on optimizing the concentrations and combinations of these additives and exploring their applications in other meat products, alongside long-term studies on their safety and consumer perceptions, to ensure successful integration into the food industry.

TABLE 9

Effect of Different Additives on Nitrosamine (NDEA) Levels (ng/ml) for Grilled Beef Kofta

| | Area | Conc.(ng/mL) |
|---|---|---|
| STD (NDEA) | 7.55E+05 | 10 |
| Control | 1.04E+05 ppm, | 6.89 |
| NaNO$_2$ (150 $ppm$) | 6.46E+05 | 42.78 |
| RC ZnONP2% | 4.22E+05 | 27.95 |
| BR ZnONP2% | 4.46E+05 | 29.54 |

Numerous modifications and variations of the present disclosure are possible in light of the above teachings. It is therefore to be understood that within the scope of the appended claims, the invention may be practiced otherwise than as specifically described herein.

The invention claimed is:

1. A method of preventing and inhibiting bacterial growth on a food product, comprising:

reacting a pomegranate peel extract with a zinc precursor solution to obtain a reaction mixture;

stirring the reaction mixture for 15 to 60 minutes at a temperature of 50 to 90° C. to obtain zinc oxide nanoparticles;

combining the zinc oxide nanoparticles with at least one extract composition selected from the group consisting of red cabbage extract and a beet root extract to obtain the plant-based additive; and contacting the plant-based additive with meat to inhibit or prevent the growth of bacteria on the meat, wherein the extract comprises 500 to 1000 parts per million of nitrate relative to a total weight of the plant-based additive.

2. The method of claim 1, wherein the zinc precursor comprises at least one selected from the group consisting of zinc sulfate heptahydrate, zinc chloride hexahydrate, zinc hydroxide dihydrate, and zinc acetate dihydrate.

3. The method of claim 1, wherein the plant-based additive is in the form of a pellet.

4. The method of claim 1, wherein the stirring comprises stirring for 60 minutes at a temperature of 70° C.

5. The method of claim 1, wherein the extract composition is a beetroot extract, and the plant-based additive comprises 894 parts per million of nitrates relative to the total weight of the plant-based additive.

6. The method of claim 1, wherein the extract composition is a red cabbage extract, and the plant-based additive comprises 678±1 parts per million of nitrates relative to the total weight of the plant-based additive.

7. The method of claim 1, wherein the reaction mixture has a volume ratio of pomegranate peel extract to zinc precursor solution of 1:35 to 1:15 pomegranate peel extract to zinc precursor solution.

8. The method of claim 1, further comprising:

separating peels from a pomegranate fruit and drying to obtain dried pomegranate peels; and grinding the dried pomegranate peels into a fine powder to obtain the pomegranate peel extract.

9. The method of claim 8, wherein the fine powder has an average particle size of 20 μm or less.

10. The method of claim 1, wherein the zinc precursor solution comprises zinc acetate dihydrate.

11. The method of claim 1, wherein the reaction mixture has a volume ratio of pomegranate peel extract to zinc precursor solution of 1:19 pomegranate peel extract to zinc precursor solution.

12. The method of claim 1, further comprising:

cooking the meat to obtain a prepared meat, wherein the plant-based additive comprises zinc oxide nanoparticles and 3 to 8 parts per million of nitrites relative to a total weight of the plant-based additive.

13. The method of claim 12, wherein the prepared meat has a total volatile nitrogen (TVN) value of 7 to 10.

14. The method of claim 12, wherein the prepared meat has a residual nitrite content of 30 to 70 parts per million relative to a total weight of the prepared meat.

15. The method of claim 12, wherein the prepared meat has a nitrosamine concentration of 20 to 35 ng/mL.

16. The method of claim 12, wherein the prepared meat has a TVN of 20.5 or less after 21 days.

17. The method of claim 12, wherein the prepared meat has a residual nitrite content of 20 to 60 parts per million relative to a total weight of the prepared meat after 21 days.

18. The method of claim 12, wherein the prepared meat has a nitrosamine concentration of 27.5 to 30 ng/mL.

19. The method of claim 12, wherein the extract composition is a beetroot extract comprising 4.5 to 5 parts per million of nitrites relative to the total weight of the plant-based additive.

20. The method of claim 12, wherein the extract composition is a red cabbage extract comprising 6.5 to 7 parts per million of nitrites relative to the total weight of the plant-based additive.

* * * * *